June 17, 1969  K. WILFERT  3,449,881
DOUBLE-WALLED MOTOR VEHICLE DOOR
Filed May 15, 1967
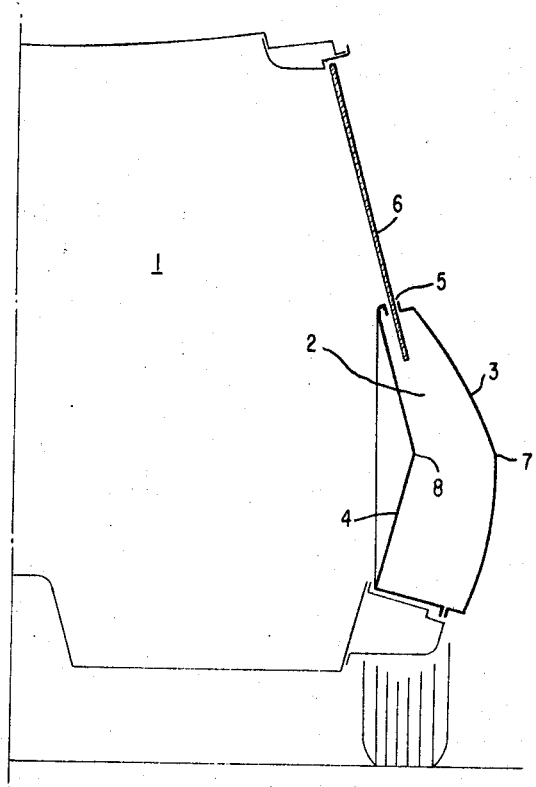
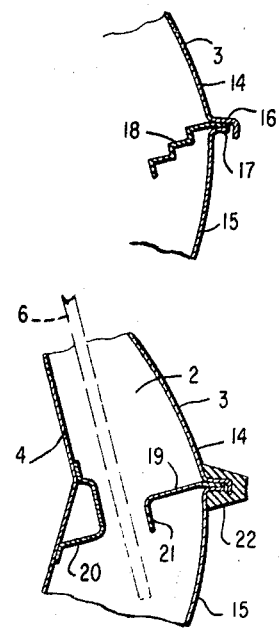
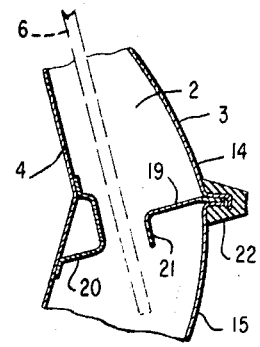
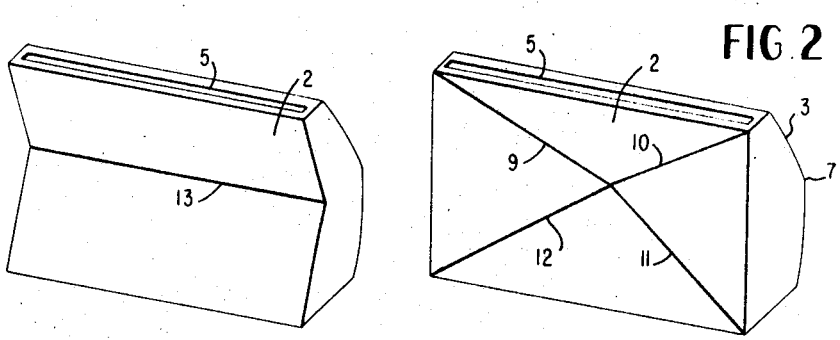
INVENTOR
KARL WILFERT
BY *Dicke & Craig*
ATTORNEYS

United States Patent Office 3,449,881
Patented June 17, 1969

3,449,881
DOUBLE-WALLED MOTOR VEHICLE DOOR
Karl Wilfert, Gerlingen-Waldstadt, Germany, assignor to Daimler-Benz Aktiengesellschaft, Unterturkheim, Germany
Filed May 15, 1967, Ser. No. 638,377
Int. Cl. E04b 2/34, 2/32; B60j 5/04
U.S. Cl. 52—615  14 Claims

ABSTRACT OF THE DISCLOSURE

A double-walled motor vehicle door, especially for passenger motor vehicles, which consists of an outer sheet metal wall and of an inner sheet metal wall arched in the direction toward the outside, of which at least the inner sheet metal wall is provided with a bend or corner at approximately half the height of the door panel. The outer sheet metal wall of the door may also be provided with a bend at approximately half the height; reinforcements extending from the outer wall from the area of its bend into the interior space of the door may be provided and reinforcing abutments may be provided along the outer surface of the inner sheet metal wall against which the reinforcements of the outer wall come into abutment in case of lateral impacts.

Background of the invention

The present invention relates to a double-walled motor vehicle door, especially for passenger motor vehicles whose outer and inner sheet metal walls are curved or arched in the outward direction.

It is known in the prior art to make the doors of passenger motor vehicles of an outer and of an inner sheet metal wall or panel which are connected with each other along the edges thereof. Frequently, the two approximately parallelly extending sheet metal panels or walls are constructed completely flat or plane. However, it is also known to slightly curve the outer sheet metal wall or panel toward the outside.

Summary of the disclosure

The present invention starts with such prior art constructions and proposes in connection therewith that at least the inner sheet metal wall or panel is provided, preferably at approximately half the height thereof, with a well-defined bend in the outward direction. A reinforcement of the door is achieved thereby whereby the injuries of the vehicle passengers, which occur during lateral collision accidents, are far-reachingly avoided. By this particular construction and configuration of the door, considerable energies are dissipated in case of lateral collision impacts.

The inner and/or outer sheet-metal walls or panels of the door are provided in an appropriate manner with a flat or nearly flat surface section and are equipped with at least one outwardly directed well defined bend.

This bend may extend horizontally at approximately half the height of the sheet metal walls or panels, preferably over the entire width of the door.

It is also favorable if the bends start with the inner sheet metal walls or panels approximately from the corners of the sheet metal wall or panel and meet in the center of the inner sheet metal wall. A pyramid-shaped body having high rigidity results therefrom.

Additionally, at least one of the sheet metal walls or panels may be provided with reinforcements which produce a reinforcement of the door against forces acting laterally thereagainst from the outside of the vehicle.

The bends may be reinforced at the outer and/or inner sheet metal walls or panels of the door by sectional strips or bars arranged preferably at half the height and extending over the entire width of the door. The sheet metal walls of the door and the profile bars or strips may be connected with each other by spot welding.

A particularly favorable construction of the present invention is achieved in that the outer and/or inner sheet metal walls or panels of the door consist of two parts connected with each other approximately in the center of the door along an approximately horizontally extending line. For purposes of further reinforcement the sectional grip or profile bar reinforcing the outer sheet metal panel of this door may be inserted with this construction between the flanges of the upper and of the lower part of the sheet metal wall. A very wide sectional strip or profile bar is preferably selected in connection therewith which extends partly into the interior space between the sheet metal walls or panels of the door. The portion of the sectional strip or profile bar extending into the interior space between the sheet metal walls or panels is appropriately constructed so as to be plastically deformable.

The inner sheet metal wall or panel may also be reinforced on the side thereof facing the outside by one or several shell-shaped or cup-shaped ribs.

Accordingly, it is an object of the present invention to provide a double-walled motor vehicle door, especially for passenger motor vehicles, which greatly increases the rigidity of the door compared to the constructions used heretofore in the prior art.

Another object of the present invention resides in a double-walled motor vehicle door which far-reachingly reduces the danger of injury to the passengers of the motor vehicle caused by lateral impacts against the door.

A further object of the present invention resides in a double-walled motor vehicle door which is so constructed and arranged as to dissipate considerable energies in case of lateral collision impact against the door.

These and further objects, features and advantages of the present invention will become more obvious from the following description when taken in connection with the accompanying drawing which shows, for purposes of illustration only, several embodiments in accordance with the present invention, and wherein:

FIGURE 1 is a schematic cross-sectional view through a motor vehicle half provided with a double-walled motor vehicle door in accordance with the present invention;

FIGURE 2 is a schematic perspective view of a door according to the present invention provided with a pyramid-shaped inner sheet metal panel;

FIGURE 3 is a perspective schematic view of a modified embodiment of a double-walled door in accordance with the present invention having a horizontal bend in the sheet metal panel thereof;

FIGURE 4 is a partial cross-sectional view through the outer wall of a door in accordance with the present consisting invention of two parts and provided with an inserted sectional strip; and FIGURE 5 is a partial cross-sectional view through a door in accordance with the present invention having an outer wall consisting of two parts with a sectional strip inserted between the flanges and an inner wall with shell-shaped ribs.

Referring now to the drawing, wherein like reference numerals are used throughout the various views to designate like parts, and more particularly to FIGURE 1, reference numeral 1 designates a motor vehicle half, schematically indicated, which includes a double-walled vehicle door 2, schematically illustrated in cross section. The motor vehicle door 2 consists of the outer sheet metal wall or panel 3 and of the inner sheet metal wall or panel 4 which are connected with each other in a conventional manner along the edges thereof. A longitudinal gap 5 for the windowpane 6 is provided in the upper part of the door 2. The sheet metal walls or panels 3 and 4 of the door 2 are provided with well defined bends 7 and 8, respectively, as protection against the indenting of the door 2 in case of lateral collision impacts. The sheet metal walls or panels 3 and 4 of the door 2 are considerably reinforced by these bends 7 and 8 so that in case of accidents a better protection for the motor vehicle passengers exists than with the prior art doors. Considerably larger forces have to be applied for the deformation of the door according to the present invention than has been the case with the prior art doors. The outer sheet metal wall or panel 3 of the illustrated door 2 is provided with a bend 7 which extends approximately horizontally over the entire width of the door 2. In contradistinction thereto, the inner sheet metal wall or panel 4 has four flat sheet metal sections and possesses an approximately pyramid-shaped configuration.

Such a door is illustrated in perspective view in FIGURE 2, viewed from the inside thereof. The bends 9, 10, 11 and 12 extend from the corners to the center of the sheet metal panel 4.

FIGURE 3 illustrates an embodiment of a door 2 in which the inner sheet metal wall or panel of the door 2 is provided with only a horizontally extending bend 13 and consists of two flat or plane sheet metal parts.

The outer and/or inner sheet metal walls of the door can be made of sheet metal parts by the conventional pressing or stamping operations. However, it is also possible to utilize for the construction of the door 2 individual sheet metal parts which, correspondingly shaped, are connected with each other at the places of the bends by spot-welding or any other known processes.

In FIGURE 4 the outer sheet metal wall or panel 3 of the door 2 is composed of two individual parts 14 and 15 which are connected with each other at their connecting places by way of flanges 16 and 17 utilizing spot welding. A section strip or profile bar 18 may be inserted between the flanges 16 and 17 which produces a further reinforcement of the sheet metal wall. This sectional bar 18 may have a large width and may extend into the interior space between the sheet metal walls 3 and 4. The portion of the sectional bar or strip 18 extending into the interior space between the sheet metal panels 3 and 4 is so constructed that in case of a lateral collision, it deforms plastically. For that purpose, this portion of the sectional bar or strip 18 may be constructed, as shown in FIGURE 4, with step-shaped angular offsets.

FIGURE 5 illustrates a section of a door 2 in cross section in which the outer wall 3 is also composed of two parts 14 and 15 and a sectional strip or profile bar 19 is inserted in the connecting place between the two parts 14 and 15. This sectional bar or strip 19 is angularly bent only once and is directed in its normal position against a shell-shaped rib 20 accommodated or secured at the inner wall 4. With a lateral collision, the outer sheet metal wall 3 of the door 2 is considerably assisted by the inner sheet metal wall 4 of the door 2 in that the sectional strip 19 comes into abutment with its angularly bent ends 21 against the shell-shaped rib 20 of the inner sheet metal wall 4.

The connecting seam of the two parts 14 and 15 of the outer sheet metal wall may be covered by a plastic or rubber strip 22.

While I have shown and described several embodiments in accordance with the present invention, it is understood that the same is not limited thereto, but is susceptible of numerous changes and modifications as known to a person skilled in the art, and I therefore do not wish to be limited to the details shown and described herein.

I claim:

1. A double-walled motor vehicle door, especially for passenger motor vehicles, said door including spaced inner and outer sheet metal walls joined along their peripheral edges, said walls each having the midportions thereof disposed, in the same direction, out of a plane defined by at least two parallel edges, the outer wall being provided with reinforcing means which produces a reinforcement of the door against lateral forces acting thereagainst from the outside, the reinforcing means including sectional strip means, wherein the outer sheet metal wall consists of two parts having flange means, and the sectional strip means are inserted between said flange means.

2. A door according to claim 1, wherein each of said walls is provided with bend means extending substantially horizontal at approximately half the height of the walls.

3. A door according to claim 2, wherein the bend means extend over the entire width of the door.

4. A door according to claim 1, wherein several bend means extend approximately from the corner of the inner wall and come together approximately in the center of the inner wall so that this wall is constructed in the form of an outwardly-directed pyramid.

5. A door according to claim 1, wherein said sectional strip means extends over the entire width of the door at approximately half the height thereof.

6. A door according to claim 5, wherein the sectional strip means and the corresponding wall of the door are connected with each other by spot welding.

7. A door according to claim 1, wherein the sectional strip means extend partly into the inetrior space between the walls of the double-walled door.

8. A door according to claim 7, wherein the portion of the sectional strip means extending into the interior space between the walls is constructed plastically-deformable.

9. A door according to claim 1, wherein the sectional strip means extends partly into the interior space between the walls of the double-walled door.

10. A door according to claim 9, wherein the portion of the sectional strip means extending in to the interior space between the walls is constructed plastically deformable.

11. A door according to claim 1, wherein the inner sheet metal wall is reinforced on the side thereof facing the outside by reinforcing rib means.

12. A door according to claim 11, wherein said rib means are of substantially shell-like shape.

13. A double-walled motor vehicle door, especially for passenger motor vehicles, said door including spaced inner and outer sheet metal walls joined along their peripheral edges, said walls each having the midportions thereof disposed, in the same direction, out of a plane defined by at least two parallel edges, one of the walls provided with reinforcing means which produces a reinforcement of the door against lateral forces acting thereagainst from the outside, one of the inner and outer sheet metal walls of the door consisting of two substantially flat parts connected with each other approximately in the center of the door along an approximately horizontally extending line, the outer sheet metal wall being provided with reinforcing sectional strip means, the outer sheet metal wall consisting of said two parts having flange means, and the sectional strip means being inserted between said flange means, the sectional strip means extending partly into the interior space between the walls of the double-walled door, the portion of the sectional strip means extending into the interior space between the walls being constructed plastically-deformable, wherein the inner sheet metal wall is reinforced on the side thereof facing the outside by reinforcing rib means.

14. A door according to claim 13, wherein said rib means are of substantially channel-shape in cross section.

References Cited

UNITED STATES PATENTS

| | | | |
|---|---|---|---|
| 762,472 | 6/1904 | Dowman | 52—615 |
| 2,916,324 | 12/1959 | Graham | 49—9 |
| 3,019,758 | 2/1962 | Erkert. | |
| 3,068,042 | 12/1962 | Barényi | 296—114 |
| 3,110,515 | 11/1963 | Loftin | 293—62 |
| 3,209,507 | 10/1965 | Dresser | 52—615 |

FOREIGN PATENTS

| | | |
|---|---|---|
| 539,102 | 6/1922 | France. |
| 1,227,840 | 8/1960 | France. |

HENRY C. SUTHERLAND, *Primary Examiner.*

U.S. Cl. X.R.

49—502; 52—630; 296—146